J. H. HOLLWEG.
Velocipedes.

No. 206,020. Patented July 16, 1878.

WITNESSES:
INVENTOR:
BY
ATTORNEYS.

UNITED STATES PATENT OFFICE.

JULIUS H. HOLLWEG, OF NEW YORK, N. Y.

IMPROVEMENT IN VELOCIPEDES.

Specification forming part of Letters Patent No. 206,020, dated July 16, 1878; application filed June 17, 1878.

*To all whom it may concern:*

Figure 1:
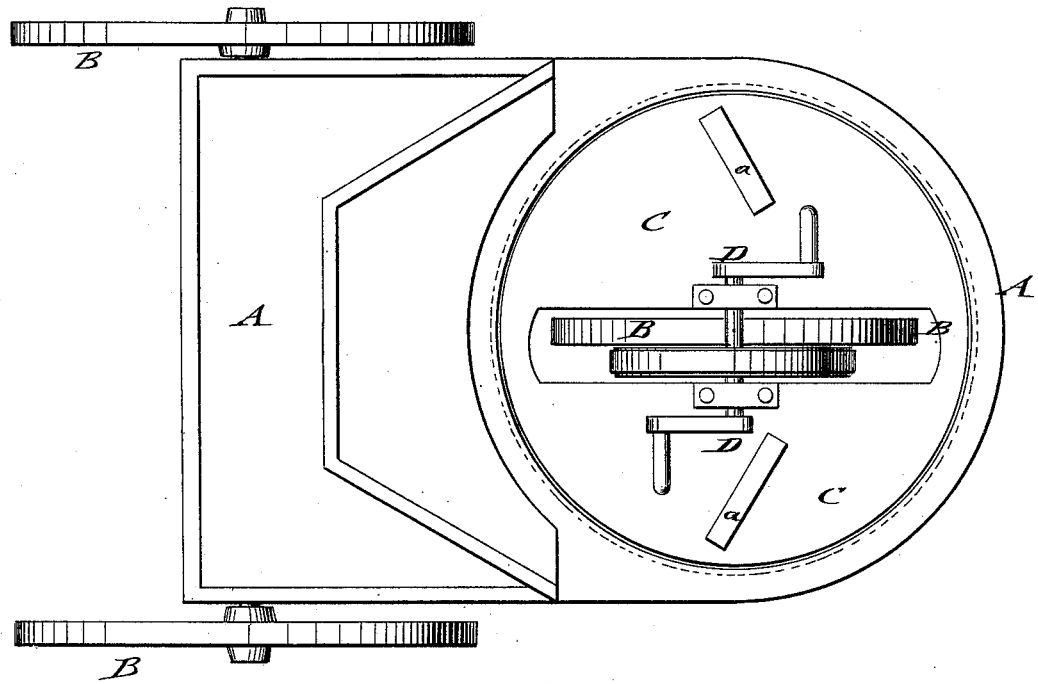
Figure 2:
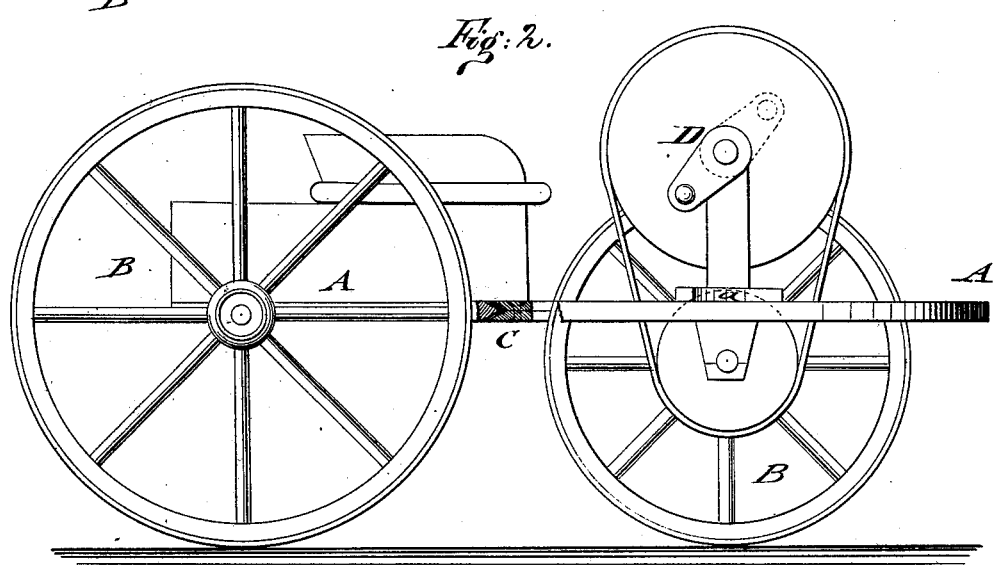

Be it known that I, JULIUS H. HOLLWEG, of the city, county, and State of New York, have invented a new and Improved Velocipede, of which the following is a specification:

In the accompanying drawing, Figure 1 represents a top view, and Fig. 2 a side elevation, partly in section, of my improved velocipede.

Similar letters of reference indicate corresponding parts.

The object of this invention is to furnish for the use of children and grown persons an improved three-wheeled velocipede of simple construction, in which the front wheel serves both as a guide and drive wheel.

Referring to the drawings, A represents the frame of my improved velocipede, which is supported on three wheels, B B, one front and two hind wheels.

The axle of the front wheel turns in bearings at the under side of a circular platform, C, that is guided by a V-shaped circumferential groove on a corresponding tongue of the encircling frame A, or in other manner.

The platform C and front wheel B are turned in any desired direction by the feet resting on treadles $a$ of the platform, and thereby the direction of motion of the velocipede conveniently changed.

The front guide-wheel extends through an opening or slot of the platform above the same, and receives, beside the guide motion imparted by the platform, a revolving or driving motion from a hand crank-shaft, D, that turns in bearings of upright standards of the platform at both sides of the slot or opening of the same.

The power is transmitted from the driving hand crank-shaft D by means of belt-and-pulley gearing or other mechanism to the axle of the front wheel, and thereby the front wheel employed for the purpose of propelling and of steering the velocipede. In this manner the velocipede is operated reliably by an exceedingly simple mechanism from the seat of the same.

The velocipede may be made of different sizes for one or two persons, and with a box back of the seat for the storage of articles.

Having thus described my invention, I claim as new and desire to secure by Letters Patent—

A velocipede consisting of two wheels on rear axle, a single front drive-wheel, a hand crank-shaft, D, and a circular platform, C, having foot-pieces $a\ a$, the front axle and shaft D being connected by belt and pulleys, as shown and described.

JULIUS H. HOLLWEG.

Witnesses:
PAUL GOEPEL,
C. SEDGWICK.